United States Patent [19]

Fleischer et al.

[11] 4,067,019

[45] Jan. 3, 1978

[54] IMPACT POSITION TRANSDUCER FOR INK JET

[75] Inventors: John Martin Fleischer; Richard Dwight Holmes, both of San Jose, Calif.

[73] Assignee: International Business Machines Corporation, Armonk, N.Y.

[21] Appl. No.: 696,101

[22] Filed: June 14, 1976

[51] Int. Cl.2 ........................ G01D 15/18; H01V 7/00

[52] U.S. Cl. ........................................ 346/75; 310/366

[58] Field of Search ...................... 346/75; 310/8, 8.3, 310/8.1, 9.8

[56] References Cited

U.S. PATENT DOCUMENTS

| | | | |
|---|---|---|---|
| 3,373,437 | 3/1968 | Sweet et al. | 346/75 |
| 3,465,350 | 9/1969 | Keur et al. | 346/75 |
| 3,790,709 | 2/1974 | Heywang | 310/9.8 X |
| 3,852,768 | 12/1974 | Carmichael et al. | 346/75 |
| 3,886,564 | 5/1975 | Naylor III et al. | 346/75 |
| 3,898,673 | 8/1975 | Haskell | 346/140 |

*Primary Examiner*—George H. Miller, Jr.
*Attorney, Agent, or Firm*—John H. Holcombe; Otto Schmid, Jr.

[57] ABSTRACT

A sensing arrangement for accurately detecting the position of ink jet or similar drop impact thereon. The drop impact occurs on the surface of a poled piezoelectric between two parallel conductors. The charge generated by drop impact is localized, the degree inversely dependent upon the piezoelectric thickness, so that the signal generated in a conductor is dependent upon the distance of the impact location from the conductor. Thus, using transimpedance amplifiers, the difference of the output signals indicates the impact position.

12 Claims, 9 Drawing Figures

IMPACT POSITION TRANSDUCER FOR INK JET

BACKGROUND OF THE INVENTION

In recent years, significant development work has been done relative to non-impact printing systems, specifically ink jet printing. There are several types of ink jet printing, including drop on demand systems, magnetic ink jet systems and electrostatic pressurized ink jet. In each of the systems, the accuracy in printing is related to the directional control over the ink jet droplets. In the systems where only a single ink jet is involved, any initial misdirection of the jet may be corrected by adjusting the aim of the jet nozzle or by biasing directional control over the ink jet drop stream. In multiple jet systems, space considerations may prevent individual control over each jet. Further, the initial directionality may be altered as a result of dried ink on the nozzle, partial clogging of the nozzle, or by wear of the nozzle. It is therefore necessary that the jet directionality be checked, not only when the nozzle is first placed in the machine for operation, but periodically.

Referring, for example, to multiple-nozzle electrostatic pressurized ink jet, conductive ink is supplied under pressure to an arrangement of closely spaced nozzles. The ink is thus propelled from each nozzle in a stream which is caused to break up into a train of individual droplets which must be selectively charged and controllably deflected for recording or to a gutter. Such a system is described in U.S. Pat. No. 3,373,437 of Richard G. Sweet et al., titled "Fluid Droplet Recorder with a Plurality of Jets". In such electrostatic systems, the drop charging occurs at a charging electrode at the time that the drop breaks off from the ink jet stream. The drop will thus assume a charge determined by the amplitude of the signal on the charging electrode at the time the drop breaks away from the ink jet stream. The drop thereafter passes through a fixed electrical field and the amount of deflection is determined by the amplitude of the charge on the drop at the time it passes through the deflecting field. In the binary type of electrostatic ink jet, such as described in Sweet et al., above, uncharged drops are not deflected and proceed directly to a recording surface positioned downstream from the deflecting means such that each such drop strikes the recording surface and forms a small spot. The deflected drops deviate from the uncharged drop path a sufficient amount such that they are intercepted by a catcher or gutter apparatus.

If the directionality of the jet stream prior to charging or if the timing of the drop breakoff relative to the charging signal are not precisely correct so that the drop will not be completely charged, the drop may be deflected an insufficient amount to be completely intercepted by the drop catcher or gutter. The drop or splatter from the drop may thus impact the recording medium.

Further, should the initial directionality of the jet stream be incorrect, the resulting spots on the recording surface would be improperly aligned.

It is therefore necessary to periodically test the directionality of the ink jet stream, whether charged or uncharged. Various systems have been developed to detect the charge synchronization of electrostatic ink jet drops, i.e., whether the drops are fully charged and thus synchronized with the charge signal. Some systems are further arranged to detect the directionality of charged drops. Examples are as follows: U.S. Pat. No. 3,852,768 of John M. Carmichael et al. entitled "Charge Detection for Ink Jet Printers" and U.S. Pat. No. 3,886,564 of Hugh E. Naylor et al. entitled "Deflection Sensors for Ink Jet Printers", both of which disclose induction sensors which may detect deflected directionality by placing the sensor at a position by which the drops of charged ink are to pass if properly charged and deflected; U.S. Pat. No. 3,898,673 of John W. Haskell entitled "Phase Control for Ink Jet Printer" discloses a multi-section gutter having a pair of contacts in one or more of the gutter sections to sense the conductivity increase when electrodes are wetted by a number of the electrostatic ink jet droplets; and U.S. Pat. No. 3,465,350 of Robert I. Keur et al. entitled "Ink Drop Writing Apparatus" describes the use of a piezoelectric member which generates a signal in response to drop impact anywhere on the member.

The induction sensors above give low amplitude signals which are sensitive to noise, are dependent upon the level of charge, and are not suitable for uncharged drops. The conductivity sensor senses the wetting of a specific area without giving specific locations within the area, and is limited to electrically conductive ink. The piezoelectric impact transducer gives a weak output signal in response to the pressure of successive drops falling anywhere thereon, and does not give specific location information.

It is therefore an object of the present invention to provide a sensing apparatus which gives precise location information without regard to the nature of the drops whose location is sensed.

SUMMARY OF THE INVENTION

In accordance with the present invention, a sensing arrangement for accurately detecting the position of drop impact is provided, which includes a flat piezoelectric and two parallel, closely-spaced conductors such that a localized charge generated in the piezoelectric by drop impact is localized and generates a signal in each conductor dependent upon the distance of the impact location from the conductor. With transimpedance amplifiers connected to the conductors, the difference of the output signals indicates the impact position.

The foregoing and other objects, features and advantages of the invention will be apparent from the following, more particular description of a preferred embodiment of the invention as illustrated in the accompanying drawings.

DETAILED DESCRIPTION OF THE PREFERRED EMBODIMENT

Figure 1:
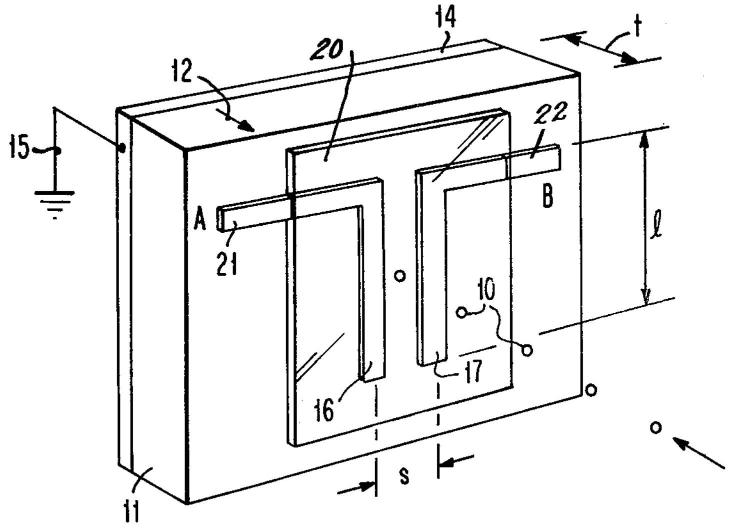
FIG. 1 is a perspective view of a drop impact transducer constructed in accordance with the present invention.

Ink jet drop stream directionality is especially important in the binary type of pressurized electrostatic ink jet systems. This is because it is the uncharged and undeflected drops which impact the recording medium and must be in proper alignment for appearance purposes. The transducer illustrated in FIG. 1 is arranged to provide location information of the impact of projectiles 10 irrespective of the electrical charge, conductivity or magnetic properties of the projectiles. As an example, the projectiles may comprise ink drops of one to two mil diameters on seven to eight mil centers.

The transducer is formed from a thin poled piezoelectric material 11. The transducer is operable without regard to the direction of polarity, but the best signal amplitude is with the transducer poled in the direction of arrow 12. As an example, and for the projectiles described, the piezoelectric material would be of a thickness t of approximately 20 mils. Exemplary piezoelectric materials include piezoelectric ceramics, lithium materials, and quartz crystals. The piezoelectric is coated on the back by an electrically conductive material of approximately three microns thickness to form an electrode 14 which is electrically grounded 15. Two finite electrical conductors 16 and 17 are deposited on the front surface of the piezoelectric 11. The conductors may, for example, be one to two mils wide and two to three microns thick. For the projectiles described above, an advantageous spacing S is 5 mils. The conductor length L is that necessary for sensing a complete row of ink jet nozzles. Should the projectiles be formed of a material that might corrode or have other deleterious effects upon the sense conductors or electrodes, a passivation layer 20 between 3 to 5 microns thickness is deposited over the piezoelectric crystal and the sense electrodes. As a specific example it has been found that a sputtered quartz layer provides adequate passivation for many ink jet inks. Sense electrodes 16 and 17 terminate respectively at output terminal pads 21 and 22.

Figure 2:
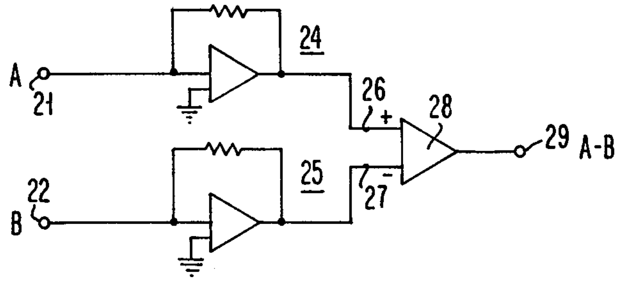
FIG. 2 is a schematic view of an electrical circuit for detecting the location of drops impacting the transducer of FIG. 1.

FIG. 2 illustrates an exemplary transimpedance amplifier network connected from the output pads 21 and 22 of FIG. 1. Terminal 21 is connected to current mode operational amplifier 24, while terminal 22 is connected to current mode operational amplifier 25. The amplifiers are connected to, respectfully, inputs 26 and 27 of comparator or subtraction circuit 28. The comparator subtracts the signal at input 27 from that at input 26. The resultant difference signal is supplied at output terminal 29. Various networks may be used, but transimpedance amplifiers for detecting the charge level have proved to have better sensitivity characteristics.

In operation, the transducer of FIG. 1 detects one ink jet out of the row by having the ink jet system charge all drops of all nozzles, save one. All the charged drops are then deflected to the gutter, while the uncharged drops of the single nozzle whose directionality is to be tested are allowed to impact the transducer. The force caused by a projectile impacting the surface of the piezoelectric is converted by the piezoelectric into a charge or voltage, depending upon the method of measurement. The charge generated is proportional to the piezoelectric $d_{ij}$ constant in coulombs/Newton times the applied force in Newtons. The resulting stress and thus the charge generated is localized around the point of impact of the small projectile. With the conductor electrodes 16 and 17, the charge collected at an electrode corresponds to the overlap of the stress field and the electrode, resulting in signal amplitudes dependent upon impact position.

Thus, should the projectile impact midway between electrodes 16 and 17, the charge collected at each electrode will be approximately equal. If the projectile impacts towards one or the other of the electrodes, the charge collected at that electrode will be substantially greater than the charge collected at the other electrode. The charge collected at the respective electrodes are amplified by the current mode operational amplifiers 24 and 25 and supplied to comparator 28. In the instance where the projectile impacted midway between the two electrodes, the output of comparator 28 at terminal 29 will be minimal. If the projectile has impacted near one or the other of the electrodes, the output at terminal 29 will be substantial, its amplitude indicating the location of the projectile between the two electrodes, and the sign indicating the one of the electrodes nearest the projectile impact location. Specifically, a positive signal indicates that the projectile impacted near electrode 16, and a negative signal indicates that the projectile impacted near sense electrode 17.

Figure 3:
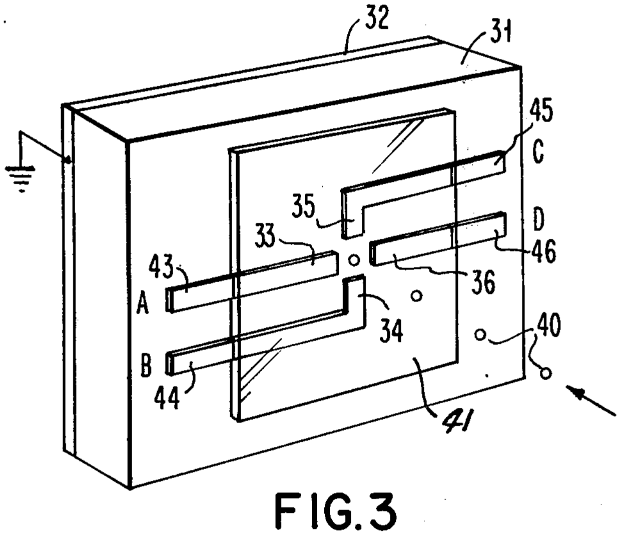
FIG. 3 comprises a perspective view of a two-dimensional drop impact transducer constructed in accordance with the present invention.

FIG. 3 illustrates a two-dimensional impact location transducer, otherwise similar to that FIG. 1. The piezoelectric material 31 is coated on the rear with a grounded back electrode 32, but has four sensor electrodes 33–36 deposited thereon so as to detect the impact location of projectiles 40 in two dimensions.

Figure 4:
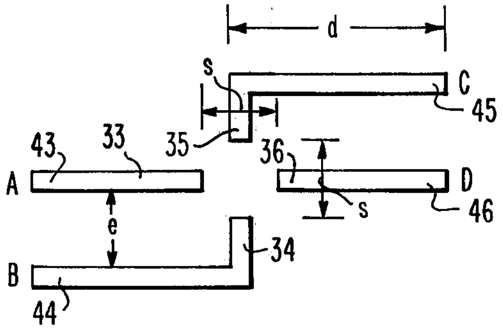
FIG. 4 comprises a detailed view of the conductor arrangement of the transducer of FIG. 3.

Referring additionally to FIG. 4, each of the electrodes may for example, be one to two mils wide for the described projectiles, and each set of electrodes, 36, 36 and 34, 35 may typically be separated by a distance S of five mils. The distance d is limited only by the capacitive effect between conductors. Hence, changing the direction of one conductor at a short distance d reduces the capacitance. Again, where corrosive inks are used the electrodes may be covered by a suitable passivation layer 41.

Each of the electrodes terminates in a connection pad 43–46, respectively. The connection pads may be separated by a distance *e* which may typically be about 100 mils. The connection pads of conductor electrodes on opposite sides of the impact area are each connected to the input terminals of an amplifier such as that of FIG. 2. Thus, for example, pad 43 is connected to terminal 21 while pad 46 is connected to terminal 22 in FIG. 2. Similarly, pad 44 would be connected to another terminal 21 and pad 45 to another terminal 22 of a second amplifier as shown in FIG. 2. Thus, the output of the first amplifier would indicate the horizontal location of the impact area and the output of the second amplifier would indicate the vertical location of the impact area.

The two-dimensional impact transducer of FIGS. 3 and 4 gives orthoganol location information. The arrangement need not be square, but may comprise any quadrilateral arrangement. As an alternative, a triangular or other multilateral arrangement may be employed. A triangular arrangement reduces the number of conductors and thus reduces the structural complexity. However, the calculations required to convert the received signals to orthoganol location information become complex.

With respect to both the transducer of FIG. 1 and the transducer of FIG. 3, for continuous accurate operation the passivation layer must be well wetted by the liquid drops so that no large drop forms on the surface and absorbs the impact shock of incoming drops.

The transducer of FIG. 3 provides accurate two-dimensional impact location information for a single jet stream. In order to utilize the transducer for plural streams, either the transducer or the ink jet heads and streams must be incremented from one stream to the next.

Figure 5:
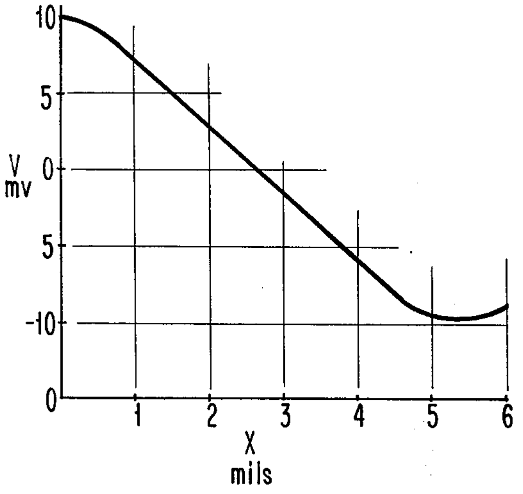
FIG. 5 is a resolution curve for the impact transducers of FIGS. 1 and 3.

Referring to FIG. 5, an exemplary resolution curve is illustrated for a transducer such as that of FIG. 1 with a center-to-center electrode spacing of 5 mils, measuring the differential output (peak-to-peak) from circuitry such as that of FIG. 2 produced as the ink drops are moved from the center of one electrode to the center of the second electrode. The resolution obtained is approximately four millivolts/mill or 40 nanoamps/mil for a distance of ± 2 mils.

Figure 6:
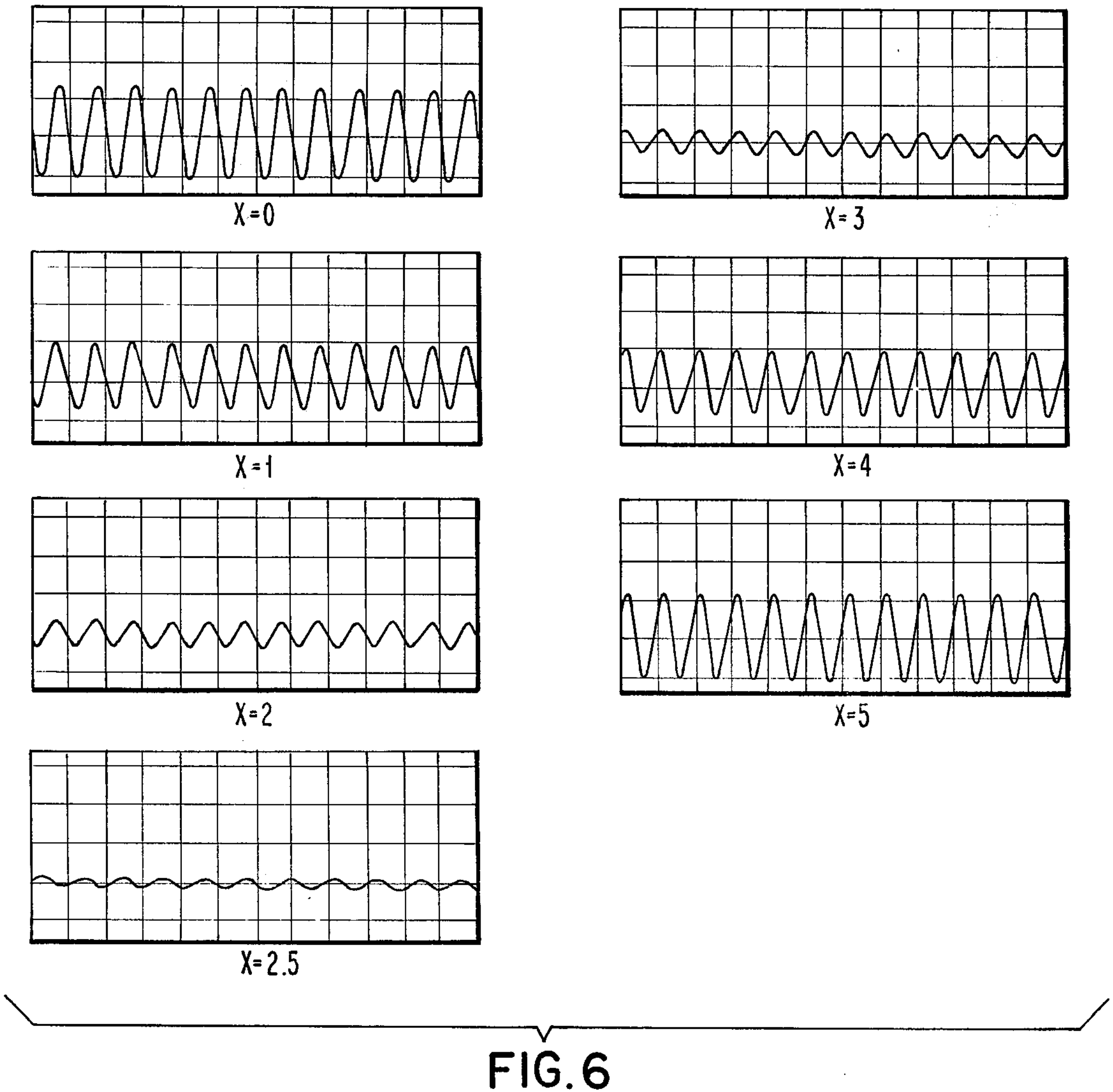
FIG. 6 is illustrative of waveforms produced in the output of the circuitry of FIG. 2 due to drop impact at various locations on a transducer of FIG. 1.

FIG. 6 illustrates approximate oscilloscope traces for the sequential impact of a stream of droplets at various locations from the center of one electrode ($x=0$) at various increments shown in mils to the center of the second electrode ($x=5$). As an example, the ink drops were approximately 1.7 mils in diameter and the velocity 450 inches/second.

Figure 7:
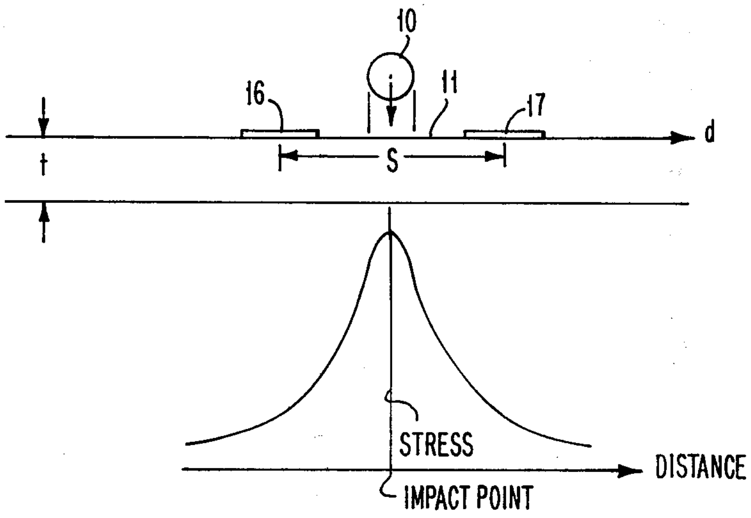
FIG. 7 is a graphical representation of the stress generation in the transducer of FIG. 1.

FIG. 7 illustrates the stress distribution resulting in the transducer of FIG. 1 from the impact of drop 10. As shown by the graph, the stress and therefore the charge generated, is highest at the impact point and decreases as the distance $d$ from the impact point increases. As the thickness $t$ of the transducer 11 increases, the stress distribution becomes flatter. This means the peak of the distribution stays about the same out to a distance $d$ of about 1 mil for a 2 mil drop diameter, but as the thickness $t$ increases, the tail energy increases. The shape of the curve is dependent upon the momentum and diameter of the drops. As the separation distance S between electrodes increases, the slope of the part of the curve being detected is less, resulting in reduced drop position resolution.

Figure 8:
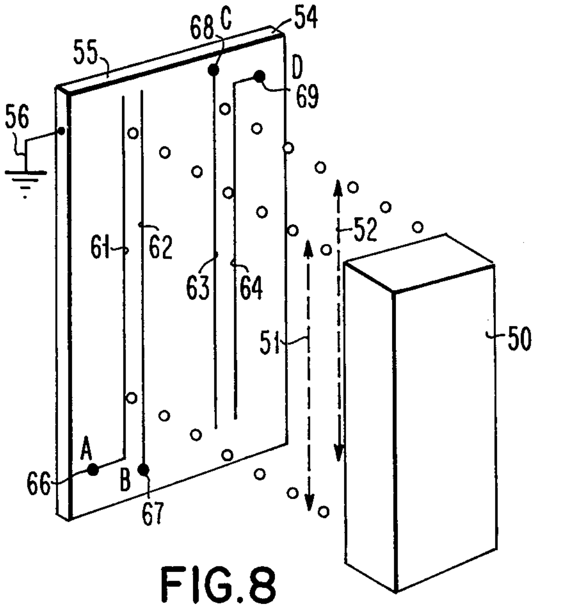
FIG. 8 is an illustration of a dual row drop impact transducer and an ink jet head assembly.

Referring to FIG. 8, a two-row ink jet head assembly 50 is illustrated including two rows of ink jet nozzles, two rows of charge electrodes, and a deflection and gutter assembly. An example of such a head is illustrated in U.S. Pat. N. 3,955,203 of Warren L. Chocholaty. The head produces two rows 51 and 52 of ink jet drop streams. A drop impact transducer for detecting the location of impact of any of the ink jet drop streams includes a piezoceramic base 54. As in the other transducers, it further includes a coated electrode 55 on the rear thereof which is grounded 56. Four sensing electrodes 61–64 sufficiently long to extend to at least all of the drop streams are deposited on the front surface of the piezoelectric. The sense conductor electrodes 61–64 are parallel to the center line of the rows of ink jet drops and equally spaced therefrom as well as parallel to one another. Each sense electrode terminates at a connection pad 66–69, respectively. As with respect to the other transducer, pads 66 and 67 are connected respectively to terminals 21 and 22 of the circuitry of FIG. 2, and pads 68 and 69 are connected respectively to terminals 21 and 22 of a similar circuit as that of FIG. 2. The output of the amplifier gives the horizontal impact location of the one drop stream out of the respective row 51 or 52 impacting the transducer.

An implementation of an ink jet system employing the subject impact transducer would best have the transducer at the same distance from the ink jet head as the recording medium (paper), but off to one side of the paper path. This forms a "home" station which would be used periodically to check jet directionality.

Figure 9:
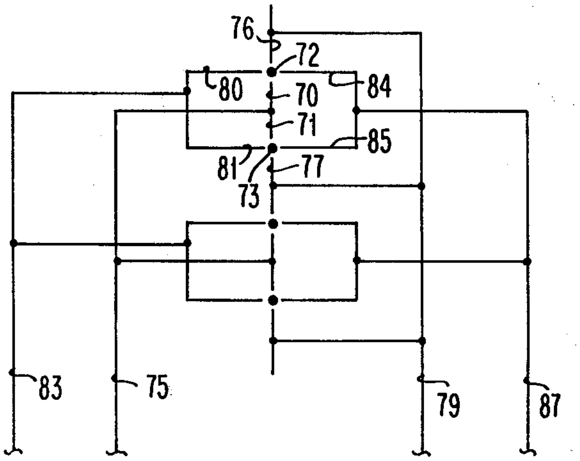
FIG. 9 is an illustration of multi-jet two-dimensional drop impact transducer.

FIG. 9 illustrates a closely-packed multi-jet arrangement of two-dimensional transducers similar to that of FIG. 3. Here, electrodes 70 and 71 for, respectively, impact areas 72 and 73 are connected in common to output line 75. Similarly, electrodes 76 and 77 are connected to output line 79; electrodes 80 and 81 are connected in common to output line 83; and electrodes 84 and 85 are connected in common to output line 87. For impact area 72, comparison circuitry connected to lines 75 and 79 give the $y$ location information and comparison circuitry connected to lines 83 and 87 give the $x$ location information. For impact area 73, the comparison circuitry connected to lines 83 and 87 still gives the $x$ location information, but the comparison circuitry connected to lines 75 and 79 now gives minus $y$ location information.

The output of the present impact transducer at amplifier 29 may also be employed as a means for detecting jet stream velocity, in that only a selected drop or burst of drops is uncharged and therefore undeflected so as to impact the transducer. By measuring the time of transit of the uncharged drop or drops, the velocity may be calculated as based upon a known distance L from the charge electrodes to the impact transducer.

Experiments have indicated that the output levels achievable with the transducer of the present invention are approximately 100 times that currently achieved with inductive sensing of electrostatic ink jet drops, and also that the signal-to-noise ratio is greater than 15.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for detecting the location of small projectile impact comprising:

a poled piezoelectric member for generating a signal due to mechanical stress produced by impact on a surface thereof by said projectile;

two parallel separated conductors on said surface of said piezoelectric member for receiving said signal; and means for detecting the relative signal strength due to said mechanical stress on said conductors.

2. The apparatus of claim 1 wherein:

said piezoelectric member additionally comprises a planar piezoelectric member poled toward one planar surface, said surface comprising said projectile impact surface.

3. The apparatus of claim 1:

additionally including a grounded electrode on the planar surface of said piezoelectric member which is opposite said projectile impact surface; and said detection means comprises additionally transimpedance amplifier means connected to each said conductor for amplifying said signal received by said conductor, and comparator means connected to said amplifier means for providing a signal representing the relative signal strengths of said amplifier signals.

4. The apparatus of claim 1 for detecting said impact location in two dimensions wherein:

said conductors comprise at least three conductors, each terminating at a separate edge of a multilateral area on said surface of said piezoelectric member, said area forming a projectile impact area, for receiving said signal.

5. The apparatus of claim 4 for detecting said impact location in two dimensions wherein:

said conductors comprises four conductors, each terminating at a separate edge of a quadrilateral area on said surface of said piezoelectric member, said quadrilateral area forming a projectile impact area, for receiving said signal; and said detection means comprising separate means, each for detecting the relative signal strength on a pair of said conductors forming opposite sides of said quadrilateral area.

6. Apparatus for detecting the impact location of an ink jet drop stream comprising:

a poled piezoelectric member for generating a localized signal upon impact on a surface thereof by each drop of said stream;

two separate parallel conductors on said surface of said piezoelectric member and on opposite sides of said impact location for receiving said localized signal; and means for detecting the relative signal strength on said conductors.

7. The apparatus of claim 6 for detecting the impact location of each of a row of ink jet drop streams, only one stream impacting said apparatus at a time, wherein:

said two parallel conductors additionally have a length at least equal to the length of said row and are on said surface on opposite sides of said impact locations for all said streams in said row.

8. The apparatus of claim 6 for detecting said impact location in two dimensions wherein:

said conductors comprise at least three conductors, each terminating at a separate edge of a multilateral area on said surface of said piezoelectric member, said area forming a drop impact area, for receiving said localized signal.

9. The apparatus of claim 8 for detecting said impact location in two dimensions wherein:

said conductors comprises four conductors, each terminating at a separate edge of a quadrilateral area on said surface of said piezoelectric member, said quadrilateral area forming a drop impact area, for receiving said localized signal; and said detecting means comprises separate means, each for detecting the relative signal strength on a pair of said conductors forming opposite sides of said quadrilateral area.

10. The apparatus of claim 7 wherein:

said piezoelectric member additionally comprises a planar piezoelectric member poled toward one planar surface, said surface comprising said drop impact surface.

11. The apparatus of claim 10 additionally comprising:

a passivation layer on said impact surface overlying said conductors and said area between said conductors for passivating any effect of said ink on said conductors.

12. The apparatus of claim 10:

additionally including a grounded electrode on the planar surface of said piezoelectric member which is opposite said drop impact surface; and said detection means additionally comprises transimpedance amplifier means connected to each said conductor for amplifying said localized signal received by said conductor, and comparator means connected to said amplifier means for providing a signal representing the relative signal strengths of said amplified signals.

* * * * *